United States Patent
White et al.

(10) Patent No.: US 6,400,968 B1
(45) Date of Patent: Jun. 4, 2002

(54) SYSTEM AND METHOD FOR EXTENDING THE RANGE OF A BASE UNIT

(75) Inventors: Stanley A. White, San Clemente, CA (US); Warner B. Andrews, Jr., Boulder, CO (US); P. Michael Henderson, Tustin, CA (US); James W. Johnston, Rancho Santa Margarita, CA (US); Kenneth S. Walley, Portola Hills, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/072,198

(22) Filed: May 4, 1998

(51) Int. Cl.[7] .................................................. H04Q 7/20
(52) U.S. Cl. ........................ 455/572; 455/575; 455/550; 455/574; 455/127
(58) Field of Search ........................ 340/875.24, 875.25, 340/875.69, 875.72; 359/145, 146, 148, 174; 370/310; 455/7, 20, 21, 11.1, 517, 550, 575, 573, 574, 127

(56) References Cited

U.S. PATENT DOCUMENTS

| | | | |
|---|---|---|---|
| 4,509,211 A | * | 4/1985 | Robbins ..................... 455/603 |
| 4,809,257 A | * | 2/1989 | Gantebein et al. .......... 359/136 |
| 4,850,040 A | | 7/1989 | Teich et al. |
| 4,864,647 A | * | 9/1989 | Harrington ................. 455/603 |
| 4,941,200 A | * | 7/1990 | Leslie et al. ................. 455/20 |
| 5,121,287 A | * | 6/1992 | Lee ............................. 361/600 |
| 5,142,397 A | * | 8/1992 | Dockery ..................... 359/145 |
| 5,815,108 A | * | 9/1998 | Terk ............................. 455/42 |
| 5,854,594 A | * | 12/1998 | Lin et al. ................ 340/825.69 |
| 5,872,513 A | * | 2/1999 | Fitzgibbon et al. .... 340/825.69 |
| 5,874,903 A | * | 2/1999 | Shuey et al. ........... 340/825.69 |
| 5,886,647 A | * | 3/1999 | Badger et al. .......... 340/825.69 |
| 6,002,393 A | * | 12/1999 | Hite et al. .................... 345/327 |

FOREIGN PATENT DOCUMENTS

| | | |
|---|---|---|
| WO | WO 92/01968 | 2/1992 |
| WO | WO 97/50192 | 12/1997 |

OTHER PUBLICATIONS

Communication Engineering, Jan.–Feb. 1954.*

* cited by examiner

*Primary Examiner*—Daniel Hunter
*Assistant Examiner*—Yemane Woldetatios
(74) *Attorney, Agent, or Firm*—Thomas, Kayden, Horstemeyer & Risley, L.L.P.

(57) ABSTRACT

A system and method for extending the range of a base unit is disclosed. The system can include repeaters and/or network decoders, each of which is housed in a network module. The network module includes a first portion for insertion into a powered outlet. The first portion receives power from the powered outlet. The network module further includes a second portion for receiving a powered device, and an electronic housing that is coupled to the first and second portions. The electronic housing encloses an electronic unit for receiving power from the first portion and selectively providing power to the second portion. The electronic unit can also include a repeater for receiving commands and re-broadcasting the commands, and/or an active network device for receiving commands, decoding the commands, and controlling at least one device based on the command. The electronic unit can receive signals and transmit signals via a wired connection or a wireless link.

11 Claims, 9 Drawing Sheets

SYSTEM AND METHOD FOR EXTENDING THE RANGE OF A BASE UNIT

BACKGROUND OF THE INVENTION

1. Field of the Invention

The present invention relates generally to the field of wireless communications, and in particular, to a system and method for extending the range of a base unit.

2. Background Art

Presently, home wireless networks include a base unit (e.g., remote control unit) and one or more devices remote from the base unit. Upon a command from the remote control unit, the device to be controlled responds accordingly. For example, a remote control for remotely controlling lamps and other lighting devices in a home can selectively connect or disconnect the lighting device from a power source. Another example is a remote control unit for selectively activating an entertainment center, such as a stereo system or a television. The base unit can be as simple as a remote control unit that employs infra-red (IR) signals or can be as sophisticated as a personal computer (PC) that employs a communication card to transmit radio-frequency (RF) signals. An automatic garage opener system is another example of a wireless system that employs RF signals for communication.

However, present home wireless systems can suffer from the following disadvantages. First, the effective range of remote control units is limited. For example, for devices having an IR interface, once the remote control unit is removed from the line-of-sight of the device, the device is effectively "out-of-range" and can no longer be controlled by the remote control unit. Even with devices that employ an RF interface (e.g., automatic garage door openers), the remote control unit must be "in range" before it can activate the device. Consider a large three story home, where the owner is on the third floor in a room that is in a far corner of the home, and the owner remembers that the garage door is open. Even if the owner attempted to employ the remote garage door opener (i.e., the remote control unit) to close the garage door, the barriers in the home (i.e., walls), layout of the home, and the distance between the remote garage door opener and the main unit in the garage may preclude the remote garage door opener from communicating with the main unit.

Second, interference can degrade or distort an intended command or instruction. If the placement of the devices relative to the base unit is not ideal, an inappropriate distribution of the transmitted signal occurs, resulting in loss of the signal, degradation of the signal, or an erroneous signal. Depending on the topology of the home (e.g., the location and thickness of the walls) and the number of barriers or objects in the home, a transmitted signal can be adversely affected by interference. Interference can stem from a source that is external to the wireless system (e.g., another system generating separate RF signals) or from reflected signals that are generated internal to the wireless system. The transmitted signal can also be attenuated by barriers or objects that completely block or partially occlude the signal path. Shielding effects can also attenuate the transmitted signal.

Accordingly, there remains a need for an improved system and method for remotely controlling one or more devices that extends the range of a base unit, that improves signal distribution, that flexibly adapts to and facilitates the convenient set-up and re-configuration of the wireless system, and that is compact and cost effective.

SUMMARY OF THE INVENTION

It is therefore an object of the present invention to provide a system and method for a base unit to extend its effective range of communication with devices to be controlled.

It is another object of the present invention to provide a system that improves signal distribution by employing network modules adapted to couple to any conventional powered outlet.

It is yet another object of the present invention to provide a network module that receives power from a conventional powered outlet socket and that does not require a separate power source.

It is yet another object of the present invention to provide a network module to house the repeater and network decoder electronics.

It is yet another object of the present invention to provide a network module that can receive a light bulb and control the on/off state of the light bulb.

It is yet another object of the present invention to provide a network module that can function as an electrical outlet and control the on/off state of the outlet.

In order to accomplish the objects of the present invention, there is provided a system and method for extending the range of a base unit so that devices that were previously out-of-range can be controlled by employing the present invention. The system includes a base unit, at least one network extender, and a plurality of devices to be controlled.

In accordance with one embodiment of the present invention, the network extender includes a repeater for receiving a control signal on a first frequency, or using a first code, from the base unit and re-transmitting the control signal on a second frequency or a second code. The network extender also includes a network decoder for receiving the control signal on the second frequency or code from the repeater, decoding the control signal, and providing the control signal to an intended device via a direct link, an RF link, or an IR link.

In accordance with another embodiment of the present invention, the network extender includes a first repeater, a second repeater, a first network decoder, a second network decoder, a first plurality of devices, and a second plurality of devices. The first repeater and the second network decoder are housed in separate network modules. The second repeater and the first network decoder are integrated into a single network module. The first repeater receives a control signal on a first frequency, or using a first code, from the base unit and re-transmits the control signal on a second frequency or second code. The second repeater receives a control signal on the second frequency or code from the first repeater, and depending on the nature of the control signal, either re-transmits the control signal on a third frequency or code, or its integrated network decoder provides the control signal to one of the first plurality of devices via a direct link, an RF link, or an IR link. The second network decoder receives the control signal on the third frequency or code from the second repeater, decodes the control signal, determines if the command or instruction is intended for one of the second plurality of devices controlled by the second network decoder, and if so, provides the control signal to the intended device via a direct link, an RF link, or an IR link.

The repeaters, network decoders, and integrated repeater and network decoder units of the present invention are each housed in a separate network module that is adapted to couple to a powered outlet and to receive a powered device.

The powered outlet can be a light bulb socket or an electrical outlet, and the powered device can be any device that requires electrical energy for its operation. Each network module receives power from the powered outlet and provides this power to the repeater and/or network decoder. Each network module further includes electronics to control the on/off state of the powered device.

In accordance with one aspect of the present invention, the first, second and third frequencies can be the same frequency, or can be different frequencies. Similarly, the first, second and third codes can be the same or different codes.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known, devices and circuits are omitted so as to not obscure the description of the present invention with unnecessary detail.

1. Systems of the Present Invention

Figure 1:
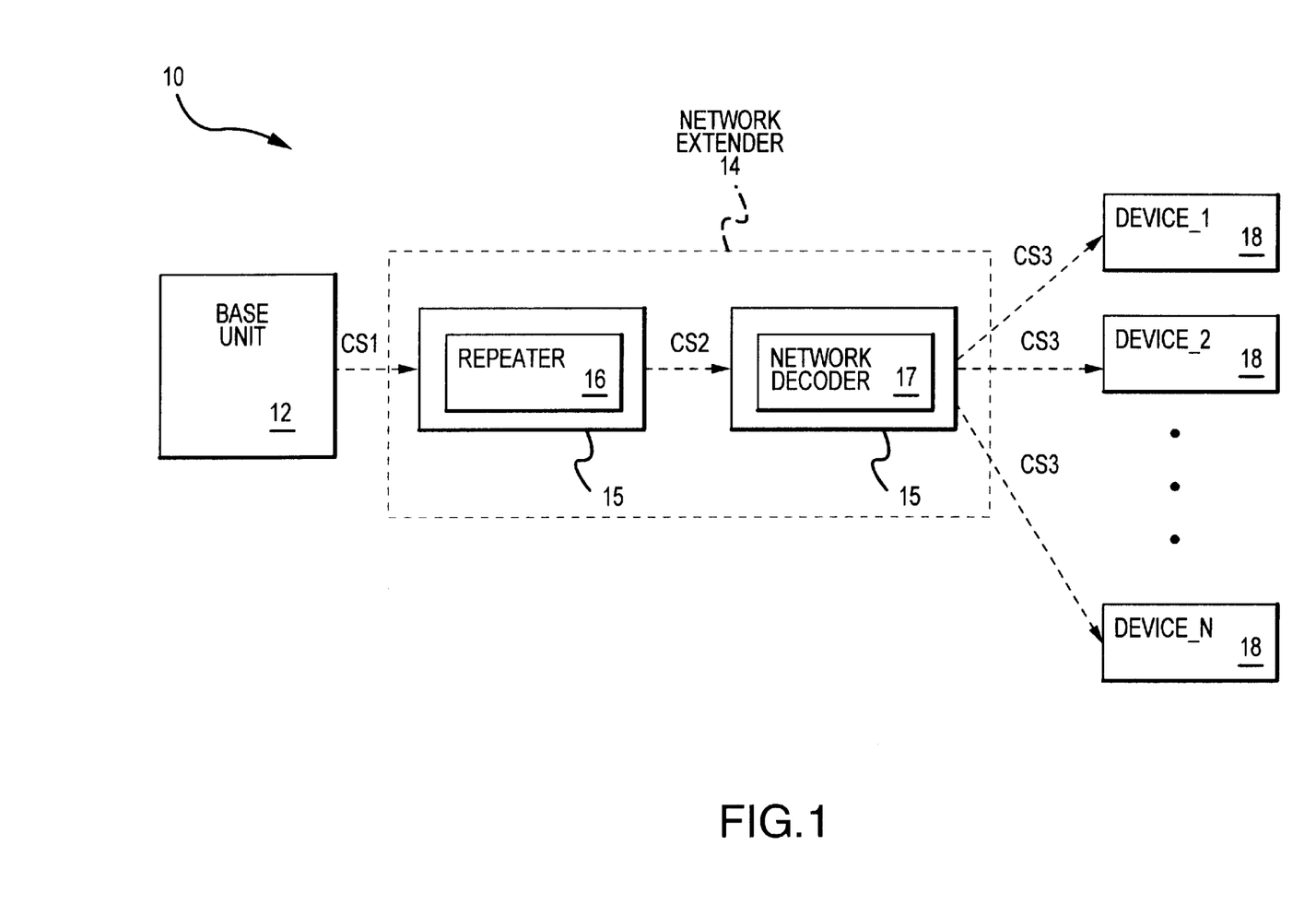
FIG. 1 is a simplified block diagram illustrating a system configured according to one embodiment of the present invention.

FIG. 1 is a simplified block diagram illustrating a system 10 configured according to one embodiment of the present invention. The system 10 can include a base unit 12, a network extender 14 of the present invention, and a plurality of devices 18 (e.g., device_1, device_2, . . . , and device_ N). The devices 18 are remote from the base unit 12, such that they are outside the communication range of the base unit 12. The base unit 12 provides one or more control signals CS1 that direct(s) the devices 18 to perform a particular function or functions.

The network extender 14 extends the range of the base unit 12 by receiving the control signals CS1 from the base unit 12 and by forwarding the control signals CS1 to the intended device 18. In this embodiment, the network extender 14 includes a repeater 16 and a network decoder 17 that may be positioned at spaced-apart locations. Preferably, the network decoder 17 is remote from the base unit 12 so that the base unit 12 cannot communicate directly with the network decoder 17, but must rely on the "link" provided by the repeater 16. The repeater 16 receives the control signal CS1 and forwards it as signal CS2 to the network decoder 17, which then re-transmits the signal CS3 to the device(s) 18 to be controlled. The repeater 16 and the network decoder 17 are each housed in a separate network module 15, which is described in greater detail hereinafter with reference to FIGS. 3a–3c.

According to one embodiment of the present invention, the three control signals CS1, CS2 and CS3 may be transmitted at different predetermined frequencies. Thus, the base unit 12 communicates with the repeater 16 at a particular frequency, so that the repeater 16 can only "hear" (i.e., communicate with) the base unit 12 and is "deaf" to any other signals being transmitted within the system (e.g., the CS2 and CS3 signals). Similarly, the repeater 16 communicates with the network decoder 17 at another particular frequency, so that the network decoder 17 can only "hear" the repeater 16 and is "deaf" to any other signals being transmitted within the system (e.g., the CS1 and CS3 signals). In addition, the network decoder 17 communicates with the devices 18 at yet another particular frequency, so that the devices 18 can only "hear" the network decoder 17 and is "deaf" to any other signals being transmitted within the system (e.g., the CS1 and CS2 signals). Transmitting the control signals CS1, CS2 and CS3 at different predetermined frequencies provides the benefit that different components in the same system will not be "confused" by competing signals. For example, both the devices 18 and the repeater 16 may be within communication range with the network decoder 17, and it may be desirable to avoid a situation where the repeater 16 is attempting to read and re-transmit the signal CS3 that is transmitted from the network decoder 17 to the devices 18.

Figure 2:
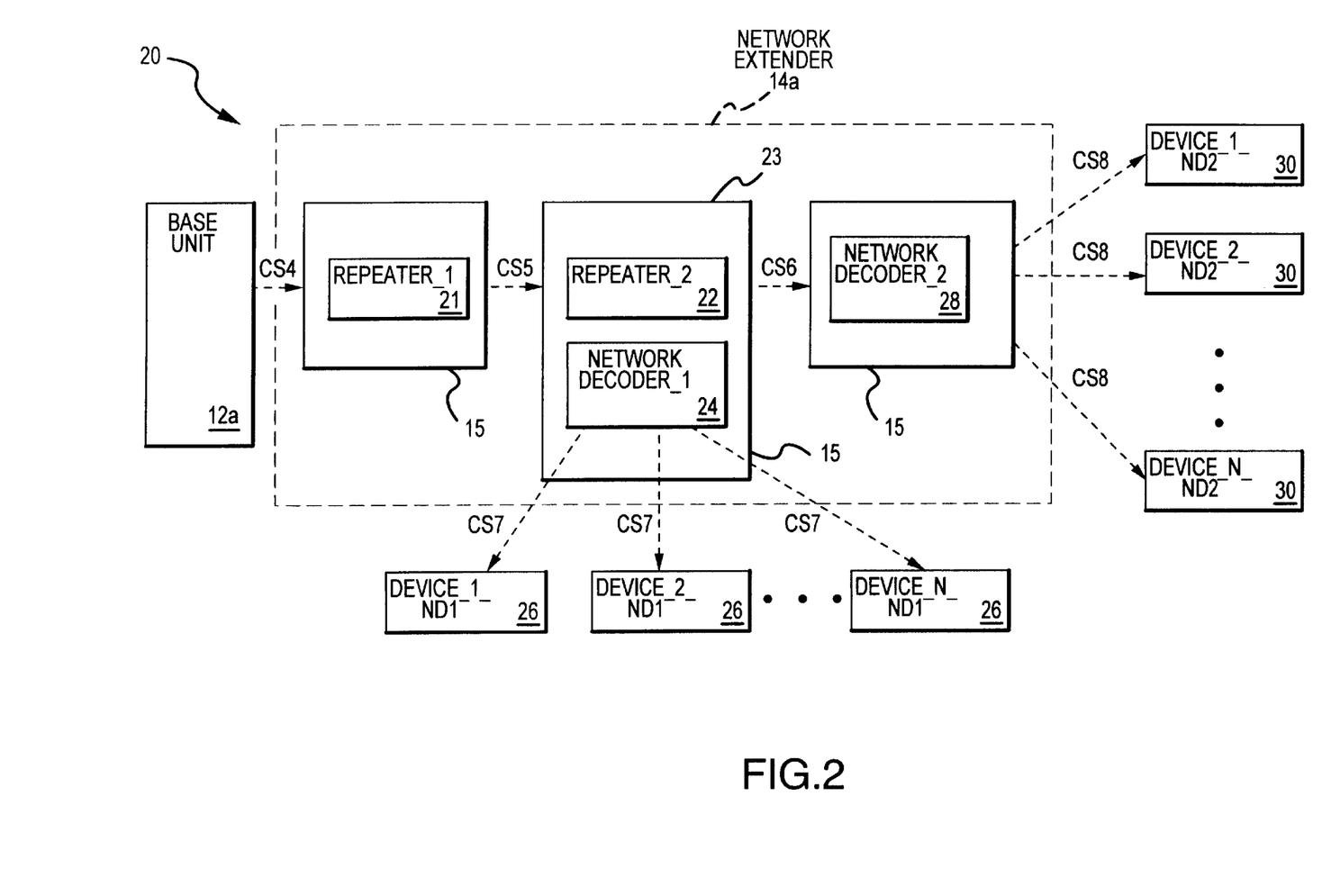
FIG. 2 is a simplified block diagram illustrating a system configured according to an alternative embodiment of the present invention.

FIG. 2 is a simplified block diagram illustrating a system 20 configured according to an alternative embodiment of the present invention. The system 20 can include a base unit 12a, a network extender 14a of the present invention, a plurality of ND1 devices 26, and a plurality of ND2 devices 30. The base unit 12a provides control signals CS4 that direct one or more of the ND1 devices 26 or ND2 devices 30 to perform a particular function or functions. The network extender 14a extends the range of the base unit 12a by receiving the control signal CS4 from the base unit 12a and by forwarding the control signal CS4 to the intended ND1 device 26 or ND1 device 30. In this embodiment, the network extender 14a includes a first repeater (i.e., repeater_1) 21 that receives the control signal CS4 from the base unit 12a, a second repeater (i.e., repeater_2) 22 that receives the control signal in the form of signal CS5 from the first repeater 21, a first network decoder (i.e., network decoder$_{-1}$1) 24 coupled to the second repeater 22 for communicating with the ND1 devices via signals CS7, and a second network decoder (i.e., network decoder$_{-2}$) 28 that receives the control signal in the form of signal CS6 from the second repeater 22. The second network decoder 28 communicates with the ND2 devices via signals CS8.

The first repeater 21 and the second network decoder 28 are each housed in separate network modules 15. The second repeater 22 and the first network decoder 24 may be housed in a single network module 15 (i.e., the second repeater 22 and the first network decoder 24 may be co-located in a single network module 15) as an integrated unit 23. The network module 15 is described in greater detail hereinafter with reference to FIGS. 3a–3c.

According to one embodiment of the present invention, each of the control signals CS4, CS5, CS6, CS7 and CS8 may be transmitted at different predetermined frequencies, so that each component or unit in the system 20 will only "hear" (i.e., communicate with) one other component and are "deaf" to the other units. For example, in this embodiment, the ND1 devices 26 can only "hear" the first network decoder 24 and are "deaf" to the base unit 12a, the first repeater 21, the second repeater 22, and the second network decoder 28 (i.e., control signals CS4, CS5, CS6 and CS8). Similarly, the ND2 devices 30 can only "hear" the second network decoder 28 and are "deaf" to the base unit 12a, the first repeater 21, the second repeater 22, and the first network decoder 24 (i.e., control signals CS4, CS5, CS6 and CS7).

Thus, the systems according to the present invention include four basic units or components. The first basic unit is the base unit (12, 12a), the second basic unit is the repeater (16, 21, 22), the third basic unit is the network decoder (17, 24, 28), and the fourth basic unit is an integrated repeater and network decoder unit 23 (e.g., 22 and 24 in FIG. 2). Each of these individual units will be described in greater detail hereinbelow. In this regard, it will be understood that any number of repeaters, network decoders, and integrated repeater and network decoder units can be employed in any desired configuration or arrangement to further extend the range of the base unit 12, 12a and to suit a particular application.

2. Network Module 15

Figure 3A:
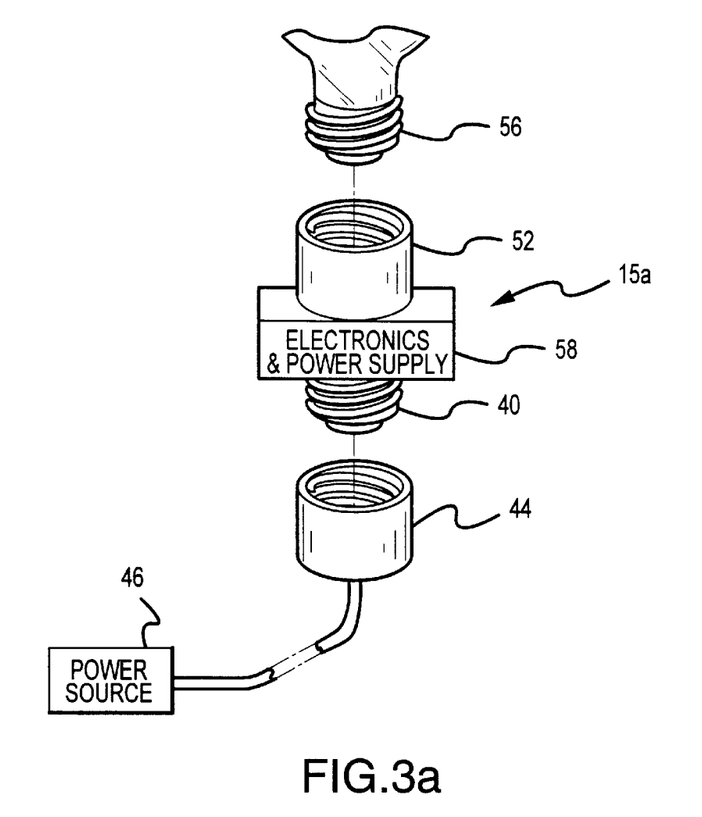
FIG. 3a is a perspective view of a network module housing of FIG. 1 and FIG. 2 configured in accordance with one embodiment of the present invention.

FIG. 3a is a perspective view of a network module 15a which may be used for the network module 15 of FIG. 1 and FIG. 2, configured in accordance with one embodiment of the present invention. The improved network module 15a of the present invention includes a first portion 40 for insertion into a conventional light socket 44. The conventional light socket 44 is connected to a power source 46. Consequently, the first portion 40 receives power from the light socket 44 and provides power to the network module 15a. This power can be harnessed by providing a small conventional power converter which provides operating-level voltages. The network module 15a includes a second portion 52 for receiving a light bulb 56. The network module 15a also includes an electronic housing 58, coupled to the first and second portions, for housing an electronic unit, such as a repeater, a network decoder or an integrated repeater and network decoder. The electronic housing 58 includes additional electronics for receiving power from the first portion and for selectively providing the power to the second portion 52 (i.e., controlling the on/off state of the light bulb).

Figure 3B:
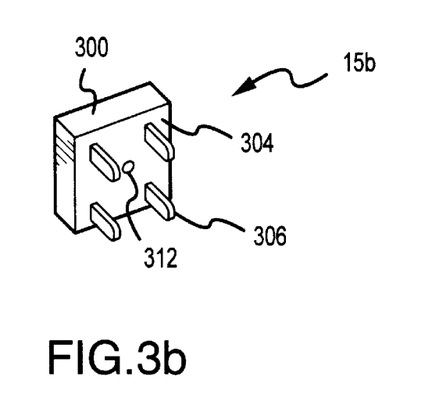
FIG. 3b is a rear perspective view of a network module housing of FIG. 1 and FIG. 2 configured in accordance with another embodiment of the present invention.
Figure 3C:
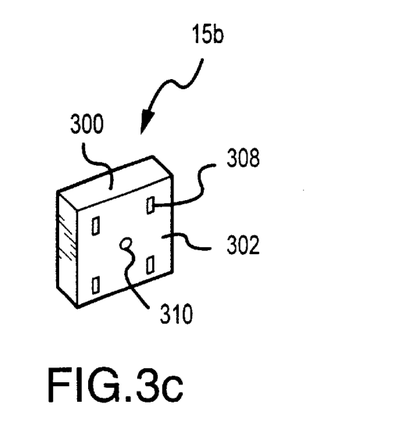
FIG. 3c is a front perspective view of the network module of FIG. 3b.

FIGS. 3b and 3c illustrate a network module 15b which may be used for the network module 15 of FIG. 1 and FIG. 2, configured in accordance with another embodiment of the present invention. The improved network module 15b of the present invention includes a housing 300 having a front portion 302 and a rear portion 304. The rear portion 304 has a plurality of prongs 306 that are adapted to be inserted into the sockets inside an electrical outlet in the wall of the house. The front portion 302 of the housing 300 has a plurality of socket slots 308 for use by the user as outlet sockets. Screw holes 310 and 312 are also provided on the front and rear portions 302, 304, respectively, so that the mounting screw (not shown) of the outlet's faceplate can be inserted through the holes 310 and 312 to secure the housing 300 to the wall. An electronic unit that includes a repeater, a network decoder or an integrated repeater and network decoder, is housed inside the housing 300. The electronic unit also includes additional electronics that are coupled to the front and rear portions 302, 304 for receiving power from the outlet and for selectively providing the power to the front portion 302 so that the socket slots 308 can be used by the user as electrical outlets. To ensure that the network module 15b is functional, the switch for the outlet should always be turned on.

3. Base Unit 12

Figure 4:
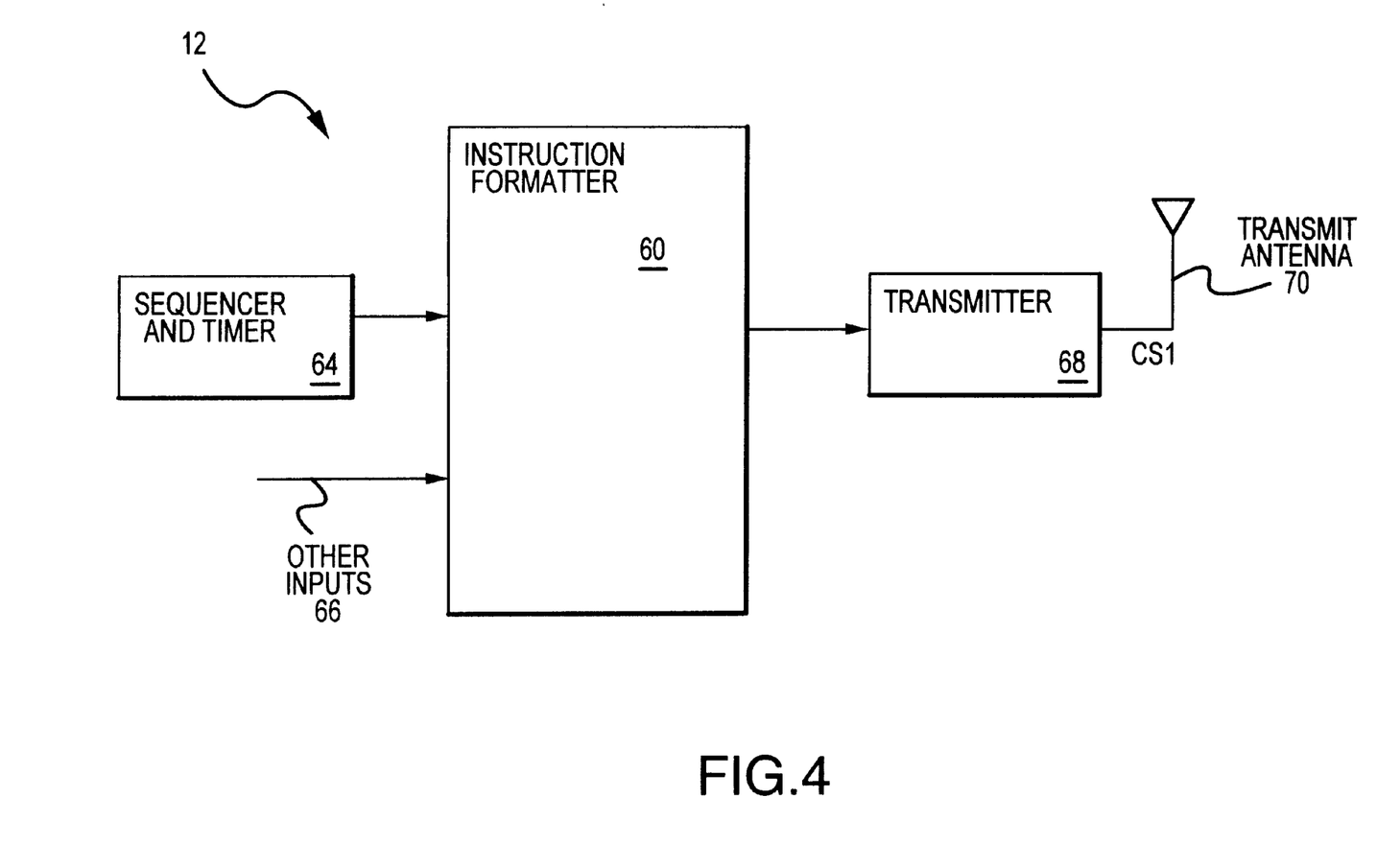
FIG. 4 is a simplified block diagram illustrating the base unit of FIG. 1 and FIG. 2 configured in accordance with one embodiment of the present invention.

FIG. 4 is a simplified block diagram illustrating the base unit 12 of FIG. 1 configured in accordance with one embodiment of the present invention. The base unit 12a of FIG. 2 can be identical in structure and operation to the base unit 12.

A base unit 12 can be a personal computer (PC) adapted for transmitting radio-frequency (RF) signals or can be a remote control unit (e.g., a control unit, a television remote control unit, or a garage door opener, among others). The base unit 12 can be any device that is capable of transmitting a control signal CS1 for controlling another device that is remote from the base unit 12.

According to one embodiment, the base unit 12 includes an instruction formatter 60 that formats the control signal CS1. The instruction formatter 60 is coupled to a timer and sequencer 64 to receive a clock signal and data, and is further coupled to receive other inputs 66 such as user inputs and command inputs (e.g., "turn on the porch light" or "close the garage door"). A transmitter 68 is coupled to the instruction formatter 60 for modulating the control signal or instruction into a modulated control signal CS1 at a first frequency. A transmit antenna 70 is coupled to the transmitter 68 for transmitting the modulated control signal CS1.

According to one embodiment, the base unit 12 can be pre-programmed with the location of each repeater 16, network decoder 17, and integrated unit 23 as these locations relate to the location of the base unit 12 within a given confined space (e.g., within a house). Thus, the base unit 12 will know the locations of the other units in the system.

4. Repeater 16

Figure 5:
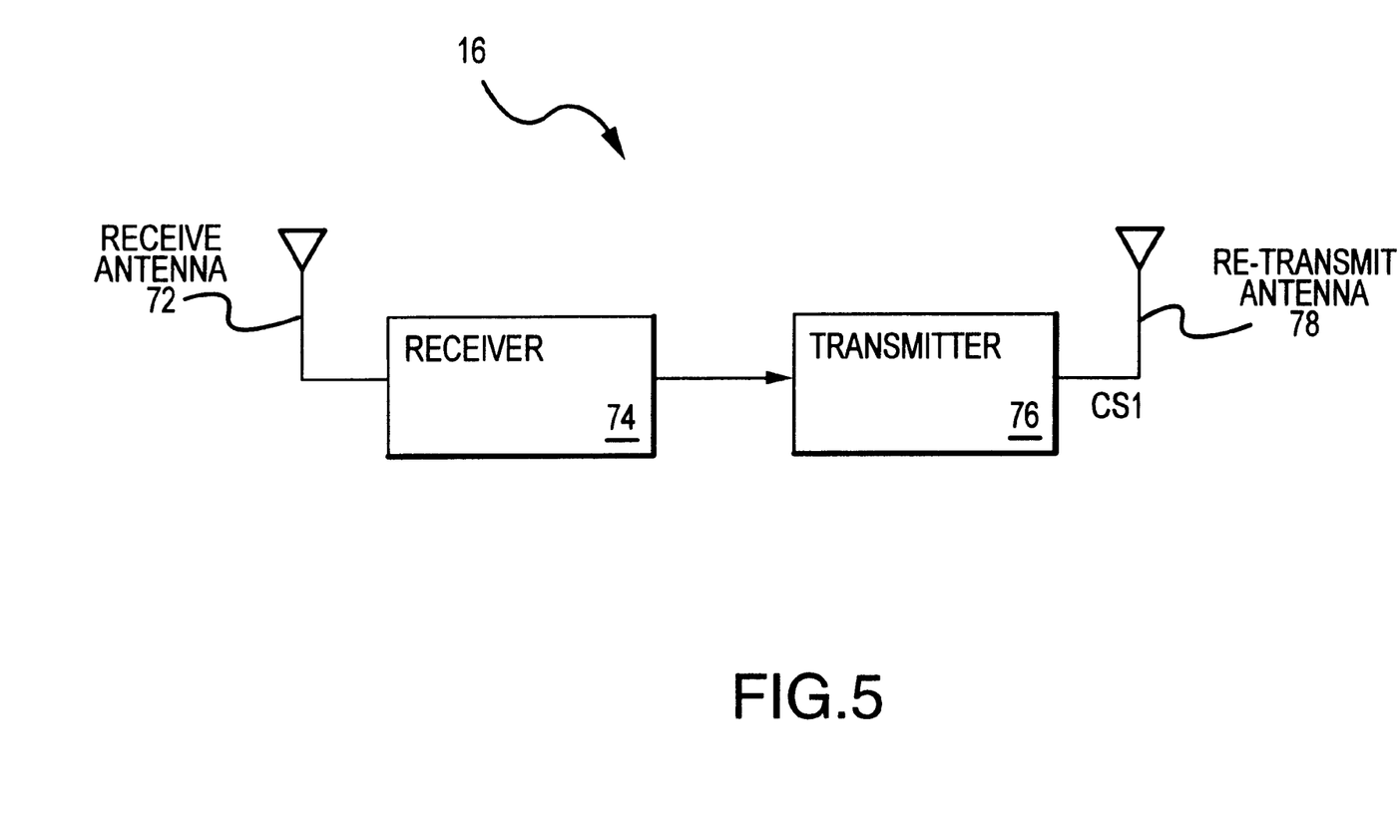
FIG. 5 is a simplified block diagram illustrating the repeater of FIG. 1 and FIG. 2 configured in accordance with one embodiment of the present invention.

FIG. 5 is a simplified block diagram illustrating the repeater 16 of FIG. 1 configured in accordance with one embodiment of the present invention. The repeaters 21 and 22 of FIG. 2 can be identical in structure and operation to the repeater 16.

The repeater 16 extends the effective range of the base unit 12 by receiving a control signal at a first frequency from the base unit 12 or another repeater, and transmitting the received control signal at a second frequency to a controlled device or another repeater. In one embodiment, the repeater 16 includes a receive antenna 72, a receiver 74, a transmitter 76 and a re-transmit antenna 78. The receive antenna 72 receives a control signal at the first frequency. The receiver 74 demodulates the modulated control signal at the first frequency to recover the control signal. The transmitter 76 modulates the control signal into a modulated control signal at the second frequency. The re-transmit antenna 38 transmits the control signal at the second frequency.

In this embodiment, the repeater 16 is tuned to receive a first frequency and transmits at a second frequency. As a result, the repeater cannot "hear" control signals transmitted at other frequencies. However, it will be understood that the repeater 16 can implement more complex protocols to achieve the same function. For example, the repeater 16 can detect a control signal in the form of an error-correction encoded spread-spectrum signal with a spreading code A. The repeater 16 then de-spreads the code A, performs error correction, and then re-encodes and re-spreads the signal with another code B that is different from the code A.

Since the location of each repeater 16 and network decoder 17 can be programmed to be known by the base unit 12, and each repeater 16 can be configured to receive signals at a unique, first predetermined frequency and to transmit signals at a unique second, predetermined frequency, in a more complex system comprising a larger number of units and devices, a base unit 12 can also select (1) a particular group of repeaters through which to communicate a control signal to a device to be controlled, and/or (2) a particular sequence of repeaters through which the control signal travels.

5. Network Decoder 17

Figure 6:
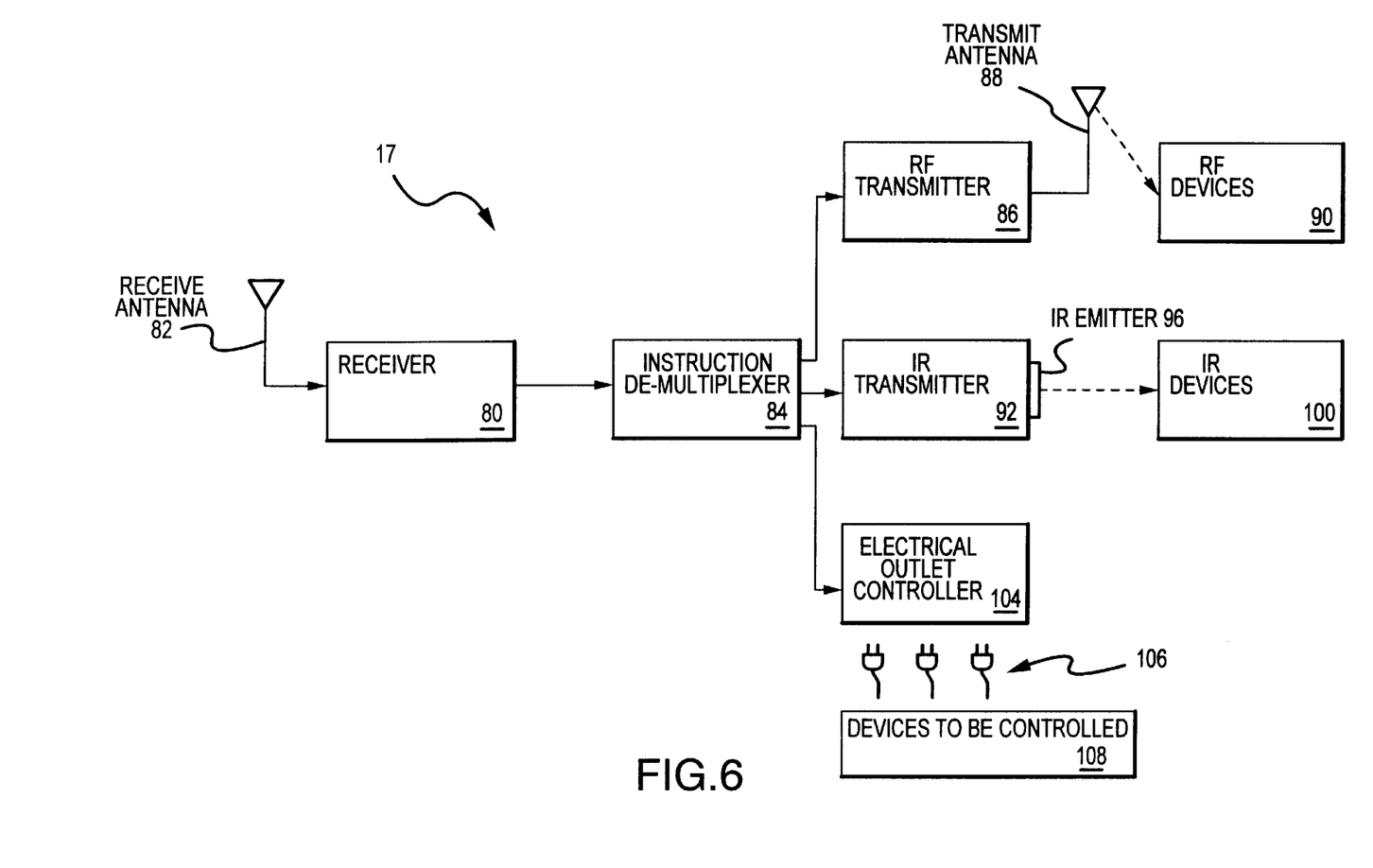
FIG. 6 is a simplified block diagram illustrating the network decoder of FIG. 1 and FIG. 2 configured in accordance with one embodiment of the present invention.

FIG. 6 is a simplified block diagram illustrating the network decoder 17 of FIG. 1 configured in accordance with one embodiment of the present invention. The network decoder 28 of FIG. 2 can be identical in structure and operation to the network decoder 17.

The network decoder 17 includes a receiver 80 coupled to a receive antenna 82 for receiving control signals from a base unit 12 or a repeater 16, and an instruction de-multiplexer 84 coupled to the receiver 80 for identifying the destination, and therefore the path to be taken by the received control signal. The network decoder 17 further includes an RF transmitter 86, an IR transmitter 92 and an electrical outlet controller 104, all of which are coupled to the instruction de-multiplexer 84 for transmitting the control signals via the appropriate channel (i.e., RF, IR or electrical connection) to devices 18. The network decoder 17 communicates with devices 18, which can include devices 90 to be controlled via an RF interface, devices 100 to be controlled via an IR interface, and devices 108 that are directly coupled to the system via a wired or cable connection.

6. Integrated Repeater and Network Decoder Unit 23

Figure 7:
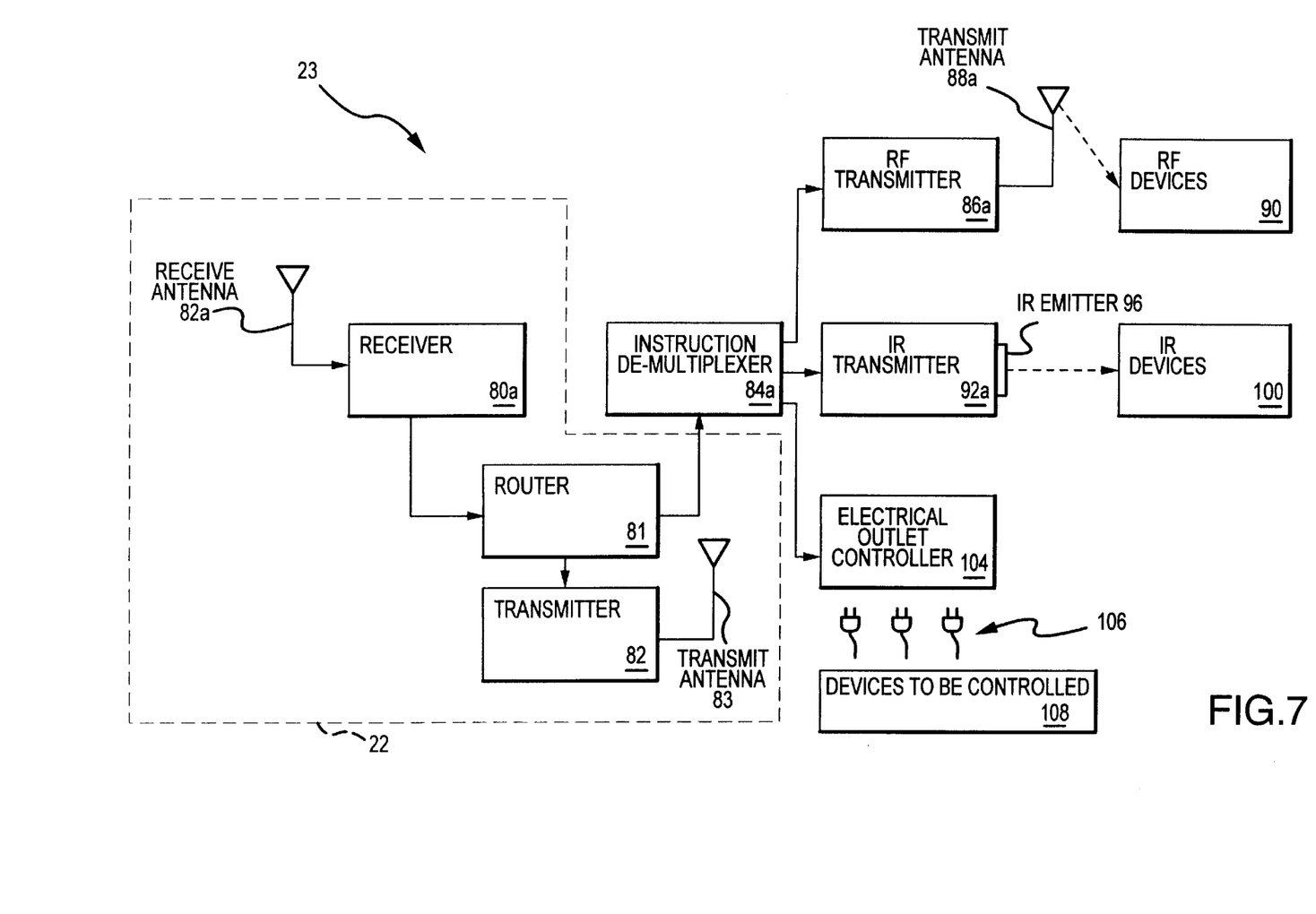
FIG. 7 is a simplified block diagram illustrating the integrated repeater and network decoder of FIG. 2 configured in accordance with one embodiment of the present invention.

FIG. 7 is a simplified block diagram illustrating the integrated unit 23 of FIG. 2 configured in accordance with one embodiment of the present invention. The components of FIG. 7 are actually the same as the components illustrated in FIG. 6, except that a router 81, a transmitter 82 and a transmit antenna 83 have been added. The components in FIG. 7 that are common to those in FIG. 6 are designated with the same numerals, but with an "a" added to the numeral designations. In the integrated unit 23, the receiver 80a and receive antenna 82a are coupled to the router 81, which determines whether the control signal CS5 is intended for an ND1 device 26 controlled by the first network decoder 24, or whether the signal is to be transmitted as signal CS6 to the second network decoder 28. The router 81 has a first output coupled to the instruction de-multiplexer 84a for controlling one of the devices 90, 100 or 108 in the event the control signal CS5 is intended for an ND1 device 26, in the manner described above in connection with the network decoder 17. The router 81 has a second output coupled to the transmitter 82 and transmit antenna 83 to re-transmit the received signal CS5 as signal CS6 to another repeater, network decoder, or integrated unit, according to the manner described above in connection with the repeater 16.

In addition, since the integrated unit 23 includes both a repeater and a network decoder, a user can decide to use an integrated unit 23 solely as a repeater, or solely as a network decoder, although this may not be fully utilizing the capabilities of the integrated unit 23.

7. Methods of the Present Invention

Figure 8:
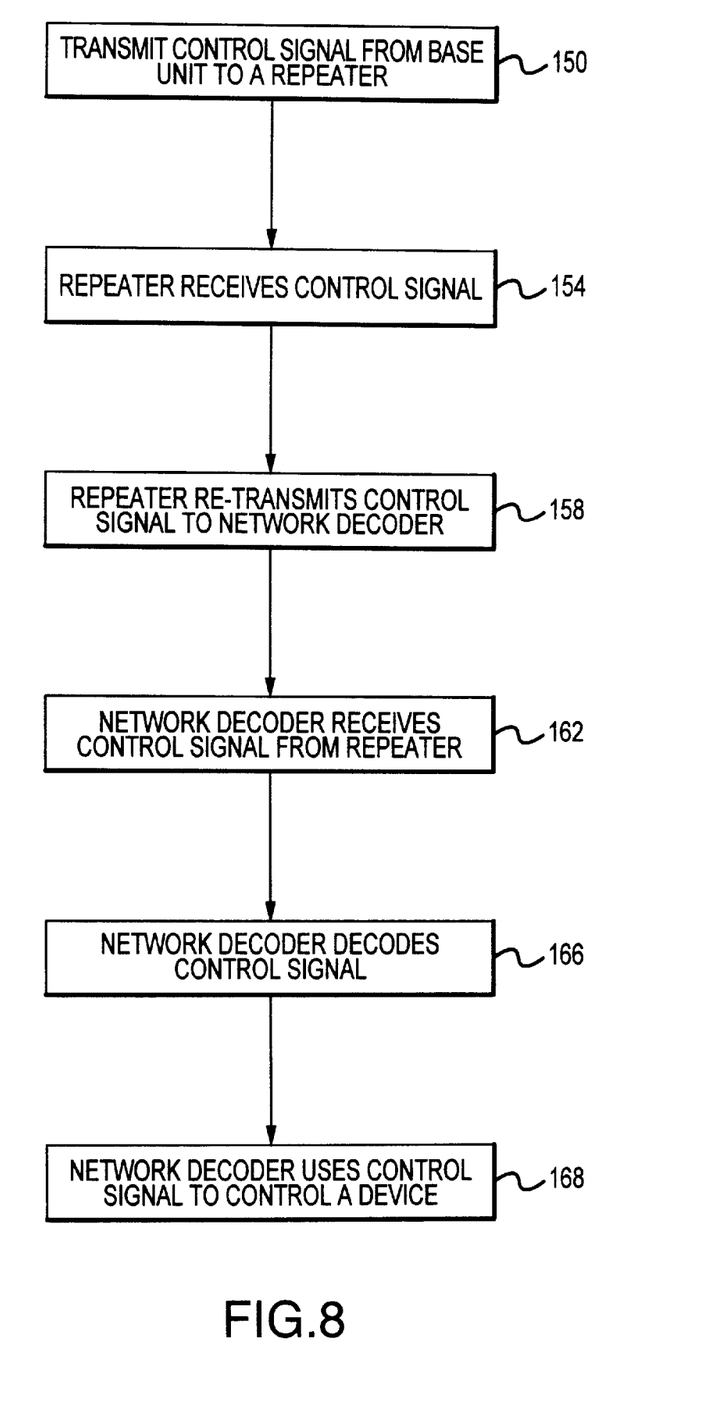
FIG. 8 is a flowchart that illustrates a method of operation carried out by the system of the present invention illustrated in FIG. 1.

FIG. 8 is a flowchart that illustrates a method of operation carried out by the system of the present invention illustrated in FIG. 1. In step 150, a control signal CS1 is transmitted by the base unit 12 to a repeater 16 at a first frequency. In step 154, the control signal CS1 is received by the repeater 14. In step 158, the repeater re-transmits the control signal as signal CS2 to a network decoder 17 at a second frequency. In step 162, the network decoder 17 receives the control signal CS2 at the second frequency. In step 166, the network decoder 17 decodes the instruction or command. In step 168, the network decoder 17 employs the instruction to control a device 18 via a signal CS3. As illustrated in FIG. 6, the devices 18 can be controlled via an RF interface, an IR interface, or a direct electrical interface.

Figure 9:
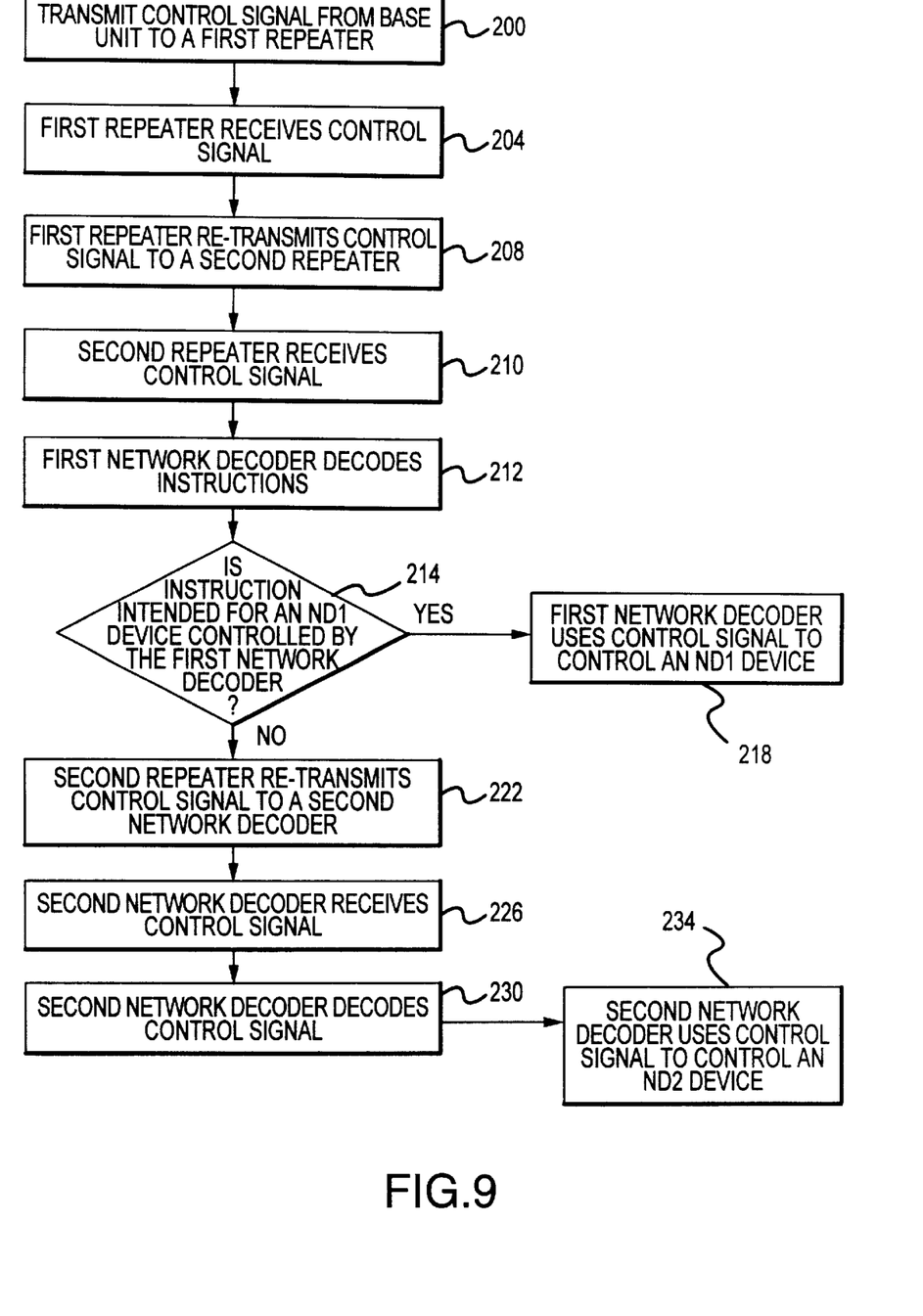
FIG. 9 is a flowchart that illustrates a method of operation carried out by the system of the present invention illustrated in FIG. 2.

FIG. 9 is a flowchart that illustrates a method of operation carried out by the system of the present invention illustrated in FIG. 2. In step 200, a control signal CS4 is transmitted by the base unit 12a to a first repeater 21 at a first frequency. In step 204, the control signal CS4 is received by the first repeater 21. In step 208, the first repeater 21 re-transmits the control signal as signal CS5 to a second repeater 22 at a second frequency. In step 210, the second repeater 22 receives the control signal. In step 212, a first network decoder 24 decodes the instruction. In step 214, a determination is made as to whether the instruction or command is intended for an ND1 device 26 controlled by the first network decoder 24. If yes, in step 218, the instruction is provided to the intended device ND1. If no, in step 222, the second repeater 22 re-transmits the command or instruction as signal CS6 to a second network decoder 28 at a third frequency. In step 226, the second network decoder 28 receives the control signal at the third frequency. In step 230, the second network decoder 28 decodes the instruction or command. In step 234, the second network decoder 28 provides the instruction to an ND2 device 30 under the control of the second network decoder 28. As illustrated in FIG. 6, the devices 26 and 30 can be controlled via an RF interface, an IR interface, or a direct electrical interface.

In addition, it is possible to extend the range of base unit 12a even further by integrating a repeater with the network decoder 28, and then providing additional repeaters, network decoders and integrated units that communicate with the integrated repeater and network decoder 28. Thus, the present invention allows a base unit 12a to be able to communicate with remote devices that are located in distant locations. For example, the owner of a large three-story home would be able to control the garage door from the third floor by providing a sequence of repeaters 16 according to the present invention linking the third floor to the garage. As a result, the owner can activate a base unit 12a on the third floor, which can use the "links" provided by the repeaters 16 to control the garage door. In this regard, all the repeaters 16 should be positioned so that they are within the range of the previous and next repeaters 16 in the sequence, to ensure a robust "link". The systems of the present invention are also cost-effective because the repeaters and network decoders can utilize the power from the light socket or electrical outlet, and do not require any additional power source.

Although the "links" between the base units 12, 12*a*, the repeaters 16, 21, 22, network decoders 17, 24, 28, and the devices 18, 26, 30 have been illustrated as being connected via a wireless link (e.g., RF-link or IR-link), it is also possible to connect these "links" via electrical or other wired connections, such as a home AC power supply.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An apparatus for use in a wireless network comprising:
   (a) a first portion for insertion into a powered outlet, said first portion receiving power from the powered outlet;
   (b) a second portion for receiving a powered device; and
   (c) an electronic housing, coupled to the first and second portions, said electronic housing having an electronic unit for receiving power from the first portion and selectively providing power to the second portion, and wherein the electronic unit includes a repeater and an instruction formatter for receiving commands in the form of a first code and rebroadcasting the commands in the form of a second code.

2. The apparatus of claim 1, wherein the repeater receives commands from a base unit through a wired link and rebroadcasts the commands through the wired link.

3. The apparatus of claim 1 wherein the repeater receives commands through a wired link and rebroadcasts the commands through a wireless link.

4. The apparatus of claim 1 wherein the repeater receives commands through a wireless link and rebroadcasts the commands through a wireless link.

5. The apparatus of claim 1 wherein the repeater receives commands through a wireless link and rebroadcasts the commands through a wired link.

6. The apparatus of claim 1 wherein the electronic unit includes an active network device for receiving commands, decoding the commands, and controlling at least one device based on the command.

7. The apparatus of claim 6 wherein the active network device includes a receiver for receiving control signals and a control signal decoder for decoding the control signals.

8. The apparatus of claim 1, wherein the powered outlet is a light bulb receptacle, and the powered device is a light bulb.

9. The apparatus of claim 1, wherein the powered outlet is an electrical outlet, and the powered device is any device which requires electrical energy for its operation.

10. The apparatus of claim 9, wherein the first portion includes a plurality of prongs that are adapted to be inserted into an electrical outlet.

11. The apparatus of claim 9, wherein the second portion includes a plurality of socket slots.

* * * * *